US009499354B2

(12) United States Patent
Jones et al.

(10) Patent No.: US 9,499,354 B2
(45) Date of Patent: Nov. 22, 2016

(54) APPARATUSES, SYSTEMS, AND METHODS FOR OPERATION OF A PNEUMATIC TUBE SYSTEM

(71) Applicant: AESYNT, Cranberry, PA (US)

(72) Inventors: Colburn Leonard Jones, Butler, PA (US); Michael Guidry, Murrysville, PA (US)

(73) Assignee: Aesynt, Cranberry, PA (US)

( * ) Notice: Subject to any disclaimer, the term of this patent is extended or adjusted under 35 U.S.C. 154(b) by 253 days.

(21) Appl. No.: 14/230,788

(22) Filed: Mar. 31, 2014

(65) Prior Publication Data

US 2015/0274441 A1      Oct. 1, 2015

(51) Int. Cl.
*G06F 7/00* (2006.01)
*B65G 51/42* (2006.01)
*B65G 51/32* (2006.01)

(52) U.S. Cl.
CPC .............. *B65G 51/42* (2013.01); *B65G 51/32* (2013.01)

(58) Field of Classification Search
USPC ........................................................ 700/230
See application file for complete search history.

(56) References Cited

U.S. PATENT DOCUMENTS

2001/0056311 A1* 12/2001 Valerino, Sr. .......... B65G 51/06
                                                                    700/214

* cited by examiner

*Primary Examiner* — Kyle Logan
(74) *Attorney, Agent, or Firm* — Alston & Bird LLP

(57) ABSTRACT

Provided herein are various apparatuses, systems, and methods for improving pneumatic tube system operating efficiency and facilitating secure access to pneumatic tube carriers. In particular, a system is provided that includes a magazine that has a first carrier chamber and a second carrier chamber and a pneumatic tube operably coupled to the magazine, where the pneumatic tube is configured to be in fluid communication with one of the first carrier chamber or the second carrier chamber. The magazine may be configured to be moved relative to the pneumatic tube between a first position in which the first carrier chamber is in fluid communication with the pneumatic tube and a second position in which the second carrier chamber is in fluid communication with the pneumatic tube. The first carrier chamber and the second carrier chamber may each be individually accessible to a user.

17 Claims, 7 Drawing Sheets

APPARATUSES, SYSTEMS, AND METHODS FOR OPERATION OF A PNEUMATIC TUBE SYSTEM

TECHNOLOGICAL FIELD

Embodiments of the present invention relate generally to operation of a pneumatic tube system. In particular, embodiments are directed to improving pneumatic tube system operating efficiency and facilitating secure access to pneumatic tube carriers.

BACKGROUND

Pneumatic tube systems have been used in industries from factories to banking to healthcare facilities for quickly and efficiently distributing articles from one location to another. Pneumatic tube systems may be simple systems configured to transfer pneumatic tube carriers from a first location to a second location, such as with drive-through bank teller pneumatic tube systems. However, some pneumatic tube systems may be substantially more complex, involving multiple diverters used to steer a carrier along one of multiple available paths, enabling pneumatic tubes to be able to be sent from a first location to a plurality of destinations. Such systems may involve controllers and more complex computing systems that communicate between multiple delivery stations and diverters.

SUMMARY

Embodiments of the present invention may provide various apparatuses, systems, and methods for improving pneumatic tube system operating efficiency and facilitating secure access to pneumatic tube carriers. In particular, embodiments may provide a system including a magazine that has a first carrier chamber and a second carrier chamber and a pneumatic tube operably coupled to the magazine, where the pneumatic tube is configured to be in fluid communication with one of the first carrier chamber or the second carrier chamber. The magazine may be configured to be moved relative to the pneumatic tube between a first position in which the first carrier chamber is in fluid communication with the pneumatic tube and a second position in which the second carrier chamber is in fluid communication with the pneumatic tube. The first carrier chamber and the second carrier chamber may each be individually accessible to a user. Embodiments may include a controller configured to cause the magazine to be moved between the first position and the second position. Embodiments may include a controller configured to control access to the first carrier chamber and the second carrier chamber.

According to some embodiments, a controller may be configured to allow access to the first carrier chamber or the second carrier chamber in response to receiving an authorized request. An authorized request may include an identification of a person requesting access to the first carrier chamber or the second carrier chamber. The controller may be configured to cause a carrier to be sent from one of the first carrier chamber or the second carrier chamber along the pneumatic tube. The contents of the first carrier chamber and the second carrier chamber may be visible to a user. According to some embodiments, the system may include a receiver configured to carry the magazine, where the receiver aligns one of the first carrier chamber or the second carrier chamber with the pneumatic tube, and where the receiver includes a release position, where the contents of the first carrier chamber and the second carrier chamber are accessible only when the respective carrier chamber is in the release position.

Embodiments of the present invention may provide a magazine for a pneumatic tube system including a first carrier chamber, a second carrier chamber, and a send-and-receive position. The first carrier chamber and the second carrier chamber may be configured to be moved between a first position in which the first carrier chamber is at the send-and-receive position, and a second position in which the second carrier chamber is at the send-and-receive position, where a chamber at the send-and-receive position is in fluid communication with a pneumatic tube of the pneumatic tube system. The first carrier chamber and the second carrier chamber may each be individually accessible. Embodiments may include an access position, where the contents of the first carrier chamber are accessible when the first carrier chamber is in the access position, and where the contents of the second carrier chamber are accessible when the second carrier chamber is in the access position. Access to the first carrier chamber and the second carrier chamber may be controlled by a controller.

Embodiments of the present invention may provide for a system including a magazine with a first carrier chamber and a second carrier chamber, a receiver configured to receive the magazine therein, where the receiver includes a send-and-receive position in which a carrier chamber at the send-and-receive position is in fluid communication with a pneumatic tube system, and a controller configured to provide access to the first carrier chamber and the second carrier chamber. The receiver may include an access position in which contents of a carrier chamber at the access position may be configured to be accessible to a user. The controller may be configured to cause the magazine to be advanced to a position in which the first carrier chamber or the second carrier chamber is aligned with the send-and-receive position or the access position. Access to the first carrier chamber or the second carrier chamber may be provided in response to the controller receiving an authorized request. An authorized request may include identification of a person requesting access to the first carrier chamber or the second carrier chamber. The contents of the first carrier chamber or the second carrier chamber may be provided for display by the controller. The controller may be configured to read an identification of a carrier received into one of the first carrier chamber or the second carrier chamber.

DESCRIPTION OF THE DRAWINGS

Reference now will be made to the accompanying drawings, which are not necessarily drawn to scale, and wherein.

DETAILED DESCRIPTION

Embodiments of the present invention may provide various apparatuses, systems, and methods for improving the operating efficiency of a pneumatic tube system and to facilitate secure access to pneumatic tube carriers. Some embodiments and components of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

The need to transport and deliver products within a facility has led to numerous solutions, each of which has advantages and disadvantages. One of these solutions is pneumatic tube systems which have been used in banks, office buildings, and drive-through pharmacies for years. However, conventional pneumatic tube systems suffer from several deficiencies. In particular, pneumatic tube carriers may arrive at a destination that is unattended, leaving the contents of the pneumatic tube carrier vulnerable to theft or tampering. Further, once a pneumatic tube carrier has arrived at a destination, that destination is generally unavailable to send or receive pneumatic tube carriers until the carrier that has arrived is removed. Embodiments of the present invention solve the aforementioned deficiencies by improving the efficiency of pneumatic tube systems and providing secure access to the pneumatic tube carriers.

Figure 1:
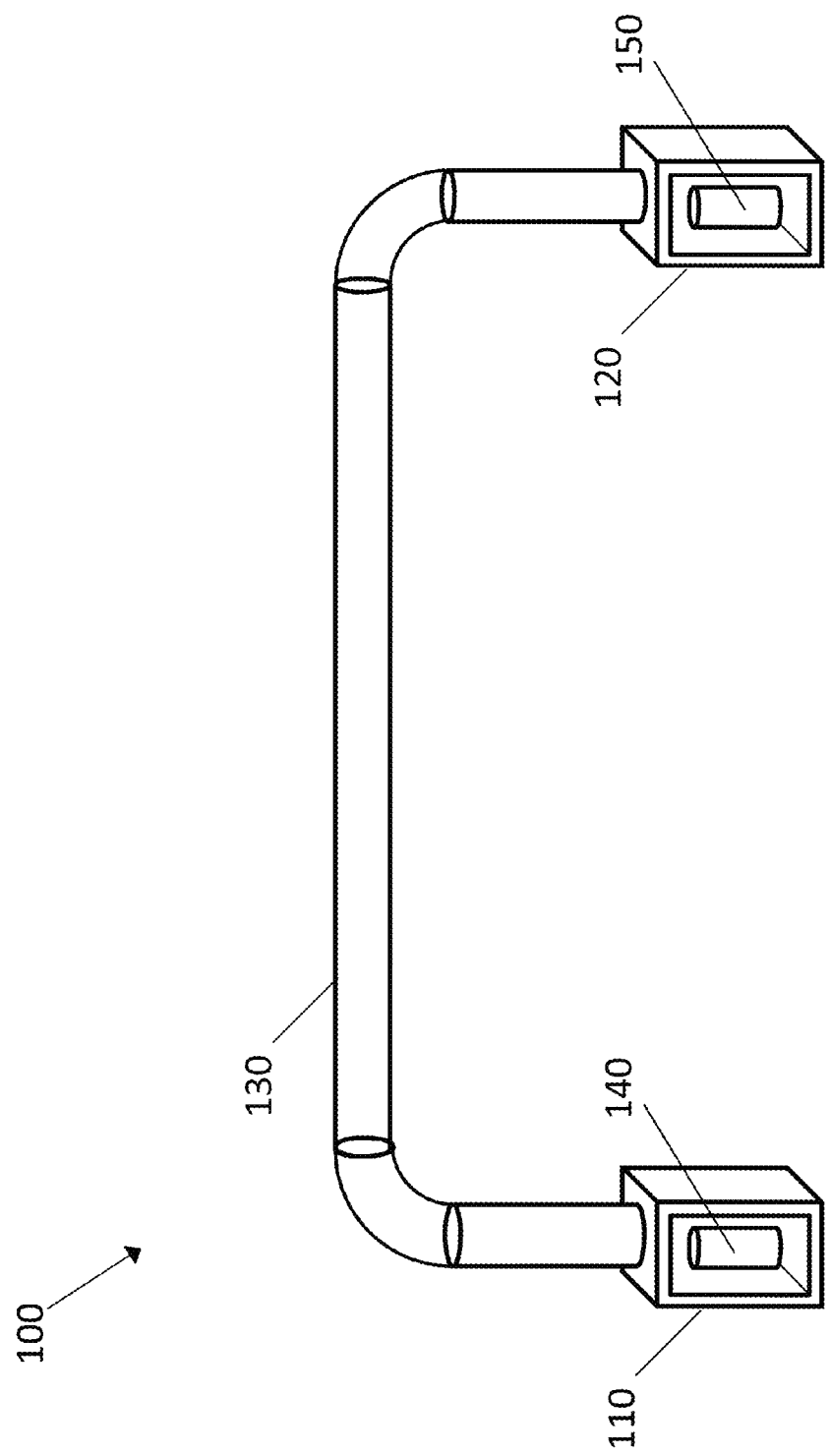
FIG. 1 illustrates an example embodiment of a pneumatic tube system.

A conventional pneumatic tube system 100 is illustrated in FIG. 1 which depicts a first pneumatic tube station 110 and a second pneumatic tube station 120. The pneumatic tube stations are send-and-receive stations in that they are capable of both sending a pneumatic tube carrier to a destination, and receiving a pneumatic tube carrier from the pneumatic tube system. The pneumatic tube stations 110, 120, are connected by the pneumatic tube 130. FIG. 1 further illustrates a first pneumatic tube carrier 140 in the first pneumatic tube station 110 and a second pneumatic tube carrier 150 in the second pneumatic tube station 120. The pneumatic tube carriers 140, 150 are propelled along the pneumatic tube by air pressure and/or suction (e.g., a vacuum), to advance from their source to their destination. The air pressure and suction can be provided by a single pneumatic pump (not shown) with a valve to switch between positive and negative pressure within the pneumatic tube system.

The embodiment of FIG. 1 is a simplified pneumatic tube system with a single pneumatic tube route between two send-and-receive stations. However, embodiments may include diverters configured to enable additional routes and send-and-receive stations to be incorporated into a single pneumatic tube system. Additional routes and diverters may require a controller to control the diverter and to appropriately route the pneumatic tube carriers from their source to their destinations.

Figure 2:
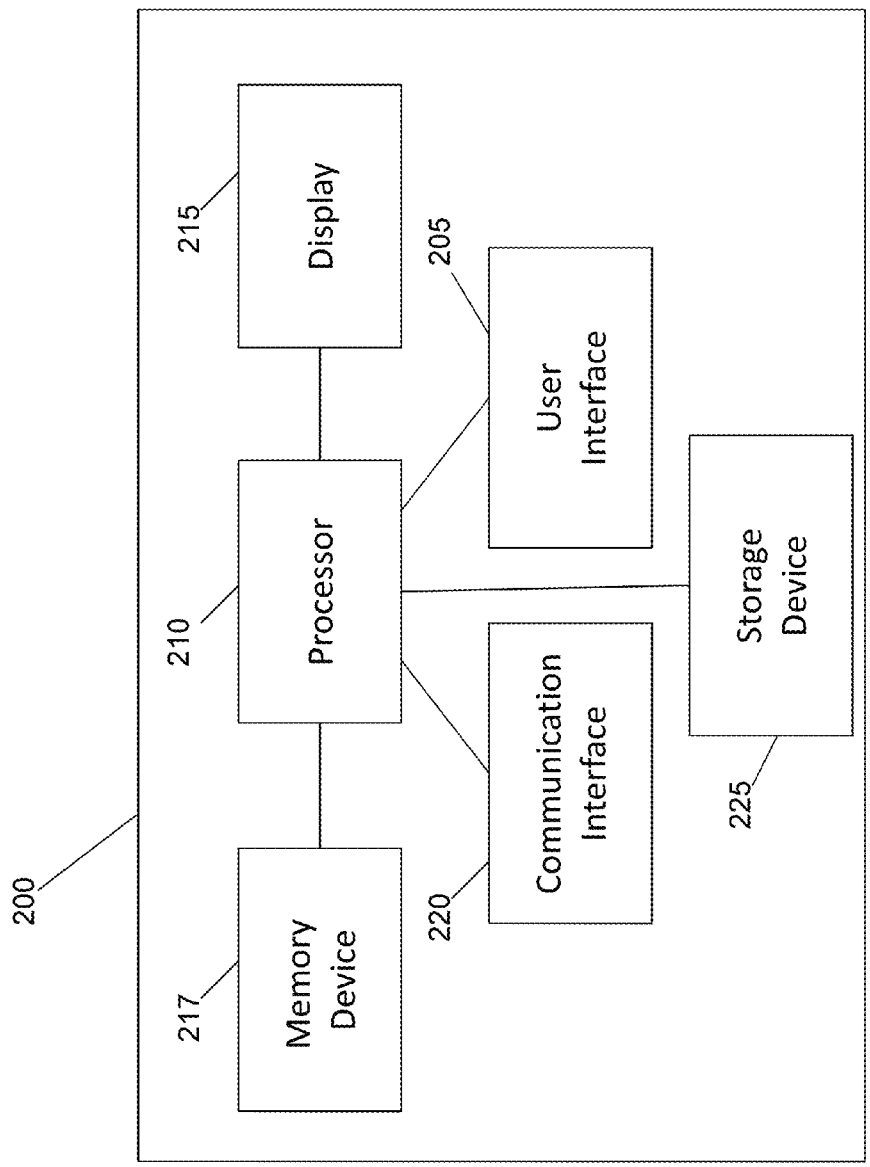
FIG. 2 illustrates an example embodiment of a pneumatic tube system controller according to the present invention.

FIG. 2 provides a schematic of a pneumatic tube system controller 200 according to one embodiment of the present invention. In general, the term "controller" may refer to, for example, any computer, computing device, mobile device, desktop, tablet, laptop, distributed system, server, blade, gateway, switch, processing device, or combination of processing devices adapted to perform the functions described herein. The pneumatic tube system controller 200 may include, be associated with, or be in communication with a variety of computing entities, such as pharmacy inventory management systems, medication dispensing units, data storage/facilitation computing entities, or other devices that may interface with transporting and delivering products. While example embodiments of a pneumatic tube system may be implemented in virtually any setting which may benefit from the transport of products through a facility, embodiments described herein will generally be described with respect to the field of healthcare in which medications, medical devices, and other articles may be distributed in a healthcare facility. However, it is appreciated that embodiments of the present invention may apply to various other implementations of pneumatic tube systems.

As will be understood from the illustration of FIG. 2, according to an example embodiment, a pneumatic tube system may be controlled by one or more pneumatic system controllers. An example embodiment of a pneumatic tube system controller 200, as shown in FIG. 2, may include processor 210 that communicates with other elements within the pneumatic tube system controller via a system interface or bus. The processor 210 may be embodied in a number of different ways. For example, the processor 210 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an exemplary embodiment, the processor 210 may be configured to execute instructions stored in memory or otherwise accessible to the processor 210. As such, whether configured by hardware or software methods, or by a combination thereof, the processor 210 may represent an entity capable of performing operations according to embodiments of the present invention when configured accordingly. For example, as discussed in more detail below, the pneumatic tube system controller 200 may be configured to enable sending and receiving of a pneumatic tube carrier, and to provide secure access to a carrier upon identification of an authorized user. A user interface 205 may be configured for a user to interact with the pneumatic tube system to input a destination for a pneumatic tube carrier, to input an identification authentication to access a pneumatic tube carrier at a station, or to request a pneumatic tube carrier, as described in further detail below. The user interface 205 may include a keyboard, a pointing device, or other mechanism for a user to communicate with the processor 210 and interact with the pneumatic tube system controller 200. A display 215 may be configured to present information to a user pertaining to a pneumatic tube carrier location, pneumatic tube carrier contents, authentication information, etc. The display 215 may also be configured to present information to a user pertaining to the status of a pneumatic tube carrier and an estimated arrival time, which may be useful to a user of the pneumatic tube system. The display 215 may include a touch screen display which may partially or fully comprise the user interface 205.

The pneumatic tube system controller 200 may further include transitory and non-transitory memory device 217, which may include both random access memory (RAM) and read only memory (ROM). The ROM may be used to store a basic input/output system (BIOS) containing the basic routines that help to transfer information to the different elements within the pneumatic tube system controller 200.

In addition, in one embodiment, the pneumatic tube system controller 200 may include at least one storage device 225, such as a hard disk drive, a CD drive, and/or an optical disk drive, for storing information on various computer-readable media. The storage device(s) 225 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like.

Furthermore, a number of executable instructions, applications, scripts, program modules, and/or the like may be stored by the various storage devices 225 and/or within memory device 215. As discussed in more detail below, these executable instructions, applications, program modules, and/or the like may control certain aspects of the operation of the pneumatic tube system controller 200 with the assistance of the processor 210 and operating system, although their functionality need not be modularized. In addition to the program modules, the pneumatic tube system controller 200 may store or be in communication with one or more databases.

Also located within the pneumatic tube system controller 200, in one embodiment, is a communication interface 220 for interfacing with various computing entities. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the pneumatic tube system controller 200 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the pneumatic tube system controller's 200 components may be located remotely from other pneumatic tube system controller 200 components. Furthermore, one or more of the components may be combined and additional components performing functions described herein may be included in the pneumatic tube system controller 200. According to an example embodiment, a pneumatic tube system controller may be located at several of the send-and-receive pneumatic tube stations distributed throughout a facility. The various controllers may be configured to communicate with one another to cooperatively control the pneumatic tube system. Optionally, the pneumatic tube system may include a primary pneumatic tube system controller, or a network entity that functions as a master controller, while the pneumatic tube stations include interfaces with the master controller, such as a plurality of user interfaces 205 functioning to interact with the master controller in a master-slave computing arrangement.

In one embodiment, a pneumatic tube system may be configured to transport medications or medical supplies throughout a healthcare facility. Many medications and supplies require restricted access due to the value or the likelihood of theft of certain medications. Further, regulations may require that certain medications or supplies have limited, controlled access to avoid tampering or theft and abuse. Embodiments of the present invention may include a secure-access send-and-receive pneumatic tube station for a pneumatic tube system. Such a secure pneumatic tube station may require a user to provide proper identification before they are permitted to access a pneumatic tube carrier at the pneumatic tube carrier station. The authentication of the identity of a user may be established by use of a personal identification number (PIN), a biometric identifier (e.g., fingerprint, palm scan, retinal scan, facial recognition, etc.), an identification card or badge (e.g., with a barcode or radio frequency identification (RFID) tag), etc.

According to an example embodiment, a pneumatic tube carrier may be filled with a prescription medication at a central pharmacy, and sent, via the pneumatic tube system, to a destination. The operator (e.g., a pharmacist or pharmacy technician) may enter a destination into the pneumatic tube system controller at the central pharmacy for a pneumatic tube carrier. The operator may also specify a particular healthcare facility employee (e.g., a nurse), to limit access to the pneumatic tube carrier. Optionally, the access may be limited to a group of healthcare facility personnel, such as nurses or nurses from a particular ward of the healthcare facility. The operator at the central pharmacy may then send the pneumatic tube carrier to the destination proximate the intended, authorized person or people.

According to some embodiments, upon arrival of the pneumatic tube carrier at the destination, a notification of the arrival may be provided. The notification may be in the form of a local alert, such as an audible and/or visual alert provided at the send-and-receive station at which the pneumatic tube carrier has arrived. This may be a light and/or audible chime that alerts those in proximity to the pneumatic tube station of the arrival of a pneumatic tube carrier. Optionally, the alert may be broadcast, such as via an available communication protocol, from the communication interface 220 of a pneumatic tube system controller 200, to various mobile or stationary devices in the vicinity of the pneumatic tube station that received the pneumatic tube carrier. For example, the nurses which may be responsible for the patients on a particular ward may be sent a message, such as a text or short-message-service (SMS) alert advising them of the arrival of the pneumatic tube carrier. Optionally, in an example embodiment in which the pneumatic tube carrier includes a medication or supply for a particular patient, that is to be accessed by a single nurse, the alert may be sent only to the responsible nurse. An alert that arrives via text or SMS message may include a description of the contents of the pneumatic tube carrier and/or a destination or patient recipient of the contents.

Figure 3:
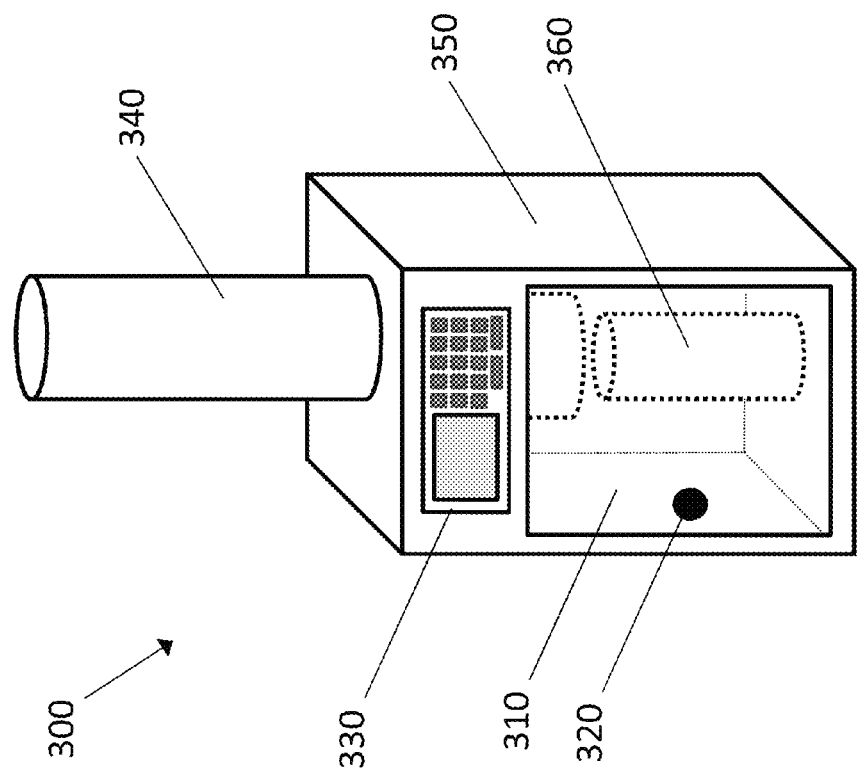
FIG. 3 illustrates a secure pneumatic tube station according to an example embodiment of the present invention.

FIG. 3 illustrates an example embodiment of a secure tube station 300 that includes an interior cavity 310, a locking door 320, and a user interface 330. A pneumatic tube carrier 360 may arrive via pneumatic tube 340 into the interior cavity 310 of the pneumatic tube station housing 350. An alert may be generated as to the arrival of the pneumatic tube carrier 360, such as via communications interface 220 of the pneumatic tube system controller 200. An authorized user (e.g., a nurse) may arrive at the pneumatic tube station 300 and authenticate their identity using the user interface 330. Upon authentication, the door 320 may be unlocked to allow the user to access the pneumatic tube carrier 360. According to some embodiments, a confirmation alert may be sent to the central pharmacy or to another healthcare facility entity to indicate that the medication has been retrieved, and the identity of the person who retrieved the medication. Such an alert may be kept as a record for future auditing, or may enable tracking of medications or supplies between the central pharmacy and the recipient patient.

While secure access to a pneumatic tube carrier may provide an improved manner for restricting access to sensitive or vulnerable products, conventional pneumatic tube systems implementing such a feature would suffer from additional drawbacks. The send-and-receive station that receives the pneumatic tube carrier may not be able to receive any further pneumatic tube carriers until the pneumatic tube carrier at the station is collected by a user. When the pneumatic tube station is a secure station as depicted in FIG. 3, if a user fails to collect the pneumatic tube carrier 360 in a timely manner, the arrival of additional pneumatic tube carriers may be delayed.

Figure 4:
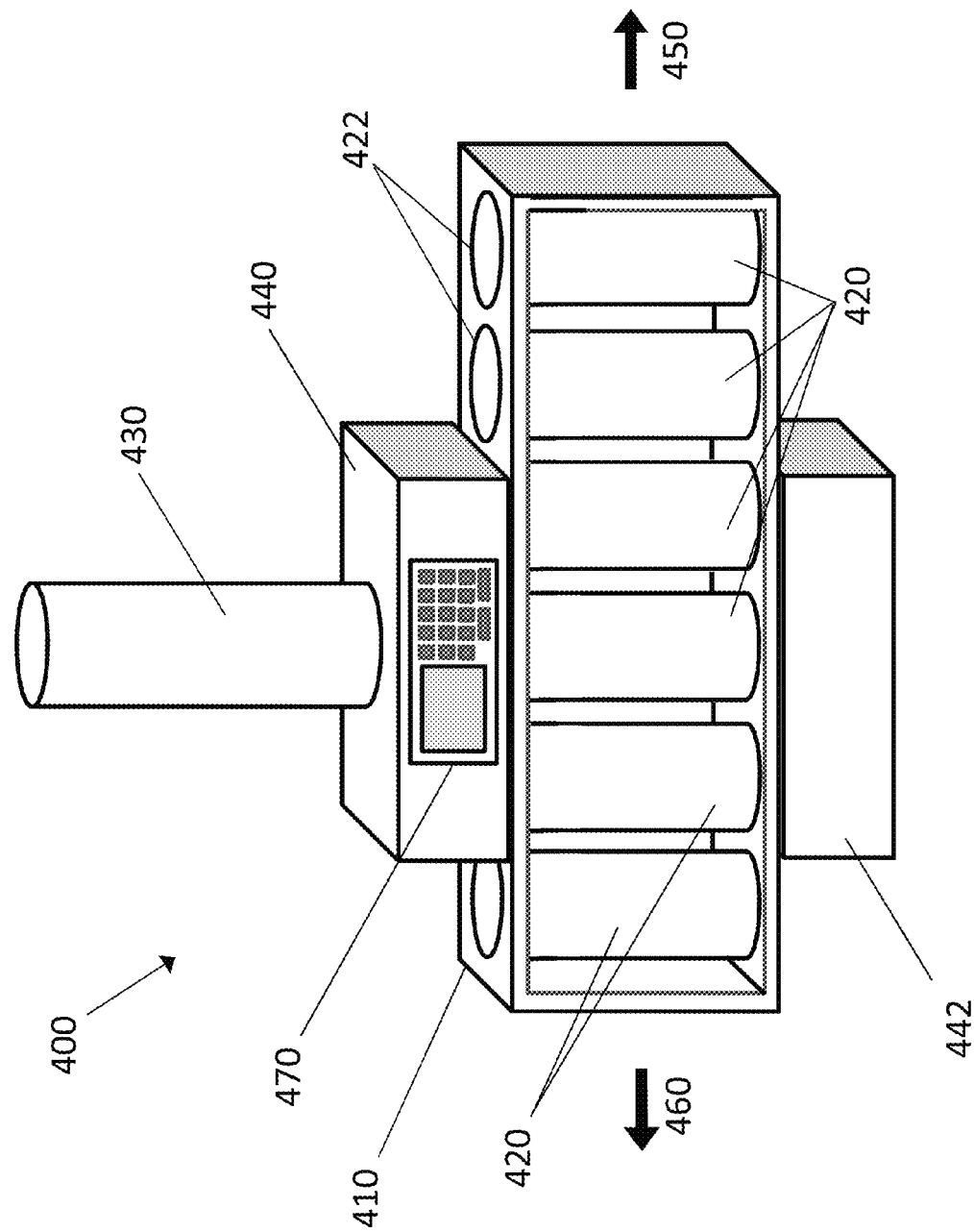
FIG. 4 illustrates a secure pneumatic tube station with a magazine of pneumatic tube carrier chambers according to an example embodiment of the present invention.

Embodiments of the present invention provide a pneumatic tube carrier system which enables secure, restricted access to a plurality of pneumatic tube carriers at a single pneumatic tube station. FIG. 4 illustrates an example embodiment of the present invention in which a pneumatic tube station 400 includes a magazine 410 with multiple pneumatic tube carrier chambers 420. Each of the pneumatic tube carrier chambers 420 is configured to receive therein a pneumatic tube carrier. The pneumatic tube carrier chambers 420 may also be used to send pneumatic tube carriers from the pneumatic tube carrier station 400. For example, a pneumatic tube carrier chamber 420 may be aligned with the pneumatic tube 430 coming in to the pneumatic tube station 400 in a send-and-receive position. In this send-and-receive position, the pneumatic tube carrier chamber 420 may send or receive a pneumatic tube carrier.

The magazine 410 of the pneumatic tube carrier station 400 may be carried by a receiver 440 which may be securely mounted, for example to a wall of a healthcare facility. The receiver 440 may include a lower support 442 as illustrated for carrying the magazine, however, the receiver may be any structure that allows movement of the magazine to move the pneumatic tube carrier chambers 420 into alignment with the pneumatic tube 430. The magazine 410 of the illustrated embodiment may move in the direction of either arrow 450 or 460 to align a respective pneumatic tube carrier chamber 420 with the pneumatic tube 430. While the illustrated embodiment depicts a magazine that moves relative to a fixed pneumatic tube 430, embodiments may include a stationary magazine with a pneumatic tube diverter that serves to align the pneumatic tube 430 with the various chambers 420 of the stationary magazine 410.

The pneumatic tube station 400 of FIG. 4 is further illustrated with user interface 470. The user interface 470 may be the user interface 205 of a pneumatic tube system controller 200 as described above with respect to FIG. 2. The user interface 470, together with controller 200, may enable the pneumatic tube station 400 to send-and-receive pneumatic tube carriers into pneumatic tube carrier chambers 420. The magazine 410 may include openings 422 that enable the pneumatic tube carrier chambers 420 to receive the pneumatic tube carriers therein. According to example embodiments in which the pneumatic tube carrier chambers are secure and provide restricted access, the openings 422 may be covered by a portion of the receiver 440, or optionally, the magazine 410 may include gates that preclude access to the pneumatic tube carrier chambers 420 when not aligned with the pneumatic tube 430.

Figure 5:
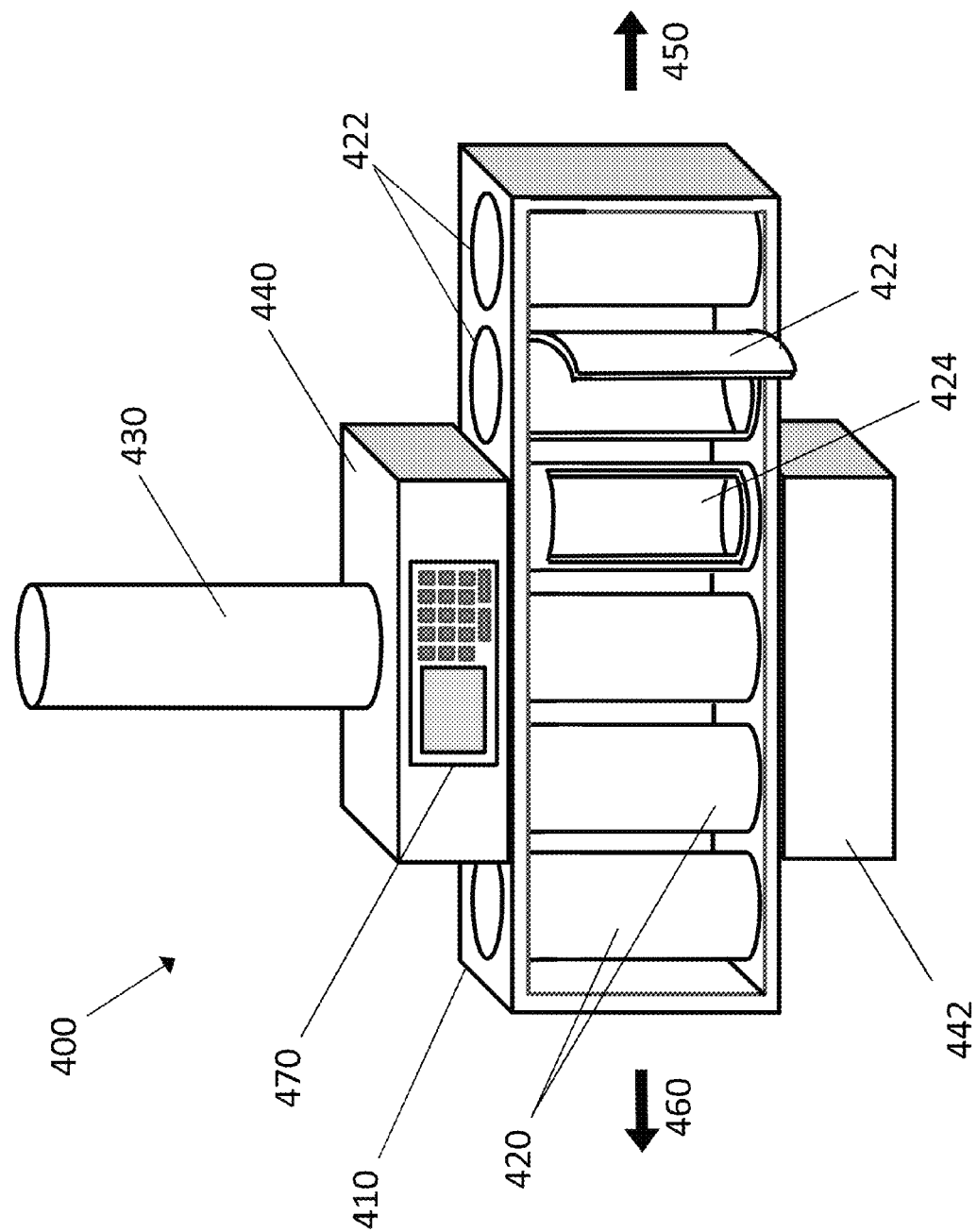
FIG. 5 illustrates the secure pneumatic tube station of FIG. 4 with two of the pneumatic tube carrier chambers in the accessible position.

Each of the pneumatic tube carrier chambers 420 may be separately lockable and/or accessible such that the user interface 470 and controller 200 may permit access to the pneumatic tube carrier of a pneumatic tube carrier chamber 420 on an individual basis. Each pneumatic tube carrier chamber 420 of the magazine 410 may include a lockable door, or the chamber may be rotatable between an accessible position in which the contents of the respective chamber are accessible, and an inaccessible position in which the contents of the respective chamber are inaccessible. Such an embodiment may be implemented by the magazine to provide a back wall of the chambers while the front wall of the chambers may be rotated out of the way to place a respective chamber in an accessible position. FIG. 5 illustrates example embodiments of two chambers 422 and 424 moved to the accessible position. As shown, the chamber 424 may rotate to present an opening in the chamber to a user, thereby allowing the user access to the contents of the chamber. The embodiment of chamber 422 includes a chamber door that may be lockable, providing secure access to the contents of the chamber 422.

According to some embodiments of the present invention, the pneumatic tube carrier chambers 420 may be accessible only in response to being in a particular location with respect to the receiver 440. For example, according to the illustrated embodiment, the lower support 442 of the receiver may include an access panel, and the lower support 442 may be configured to provide access to a pneumatic tube carrier chamber only in response to the pneumatic tube carrier chamber being aligned with the access panel and the user interface 470 and controller 200 enabling access to the chamber. A pneumatic tube carrier contained in the pneumatic tube carrier chamber may be dispensed through the access panel to a location below the receiver 440.

The magazine 410 of example embodiments may be configured to be automatically moved relative to the receiver in order to align pneumatic tube carrier chambers 420 with the pneumatic tube 430, in order to provide an empty chamber to receive a carrier, to align a chamber with an accessible position, or to align a chamber with the pneumatic tube 430 in the send-and-receive position to allow a carrier to be sent through the pneumatic tube system. In such an embodiment, in response to receiving a pneumatic tube carrier in one of the pneumatic tube carrier chambers 420 that is aligned with the pneumatic tube 430 at the send-and-receive position, the magazine may be moved to a position in which an empty pneumatic tube carrier chamber 420 is aligned with the pneumatic tube in the send-and-receive position in order to be able to receive a subsequent pneumatic tube carrier. Optionally, the magazine 410 may be manually moved relative to the receiver 430 to align a pneumatic tube carrier chamber 420 with the pneumatic tube 430 in the send/receive position, or to align a pneumatic tube carrier chamber 420 with an accessible position, as needed.

Figure 6:
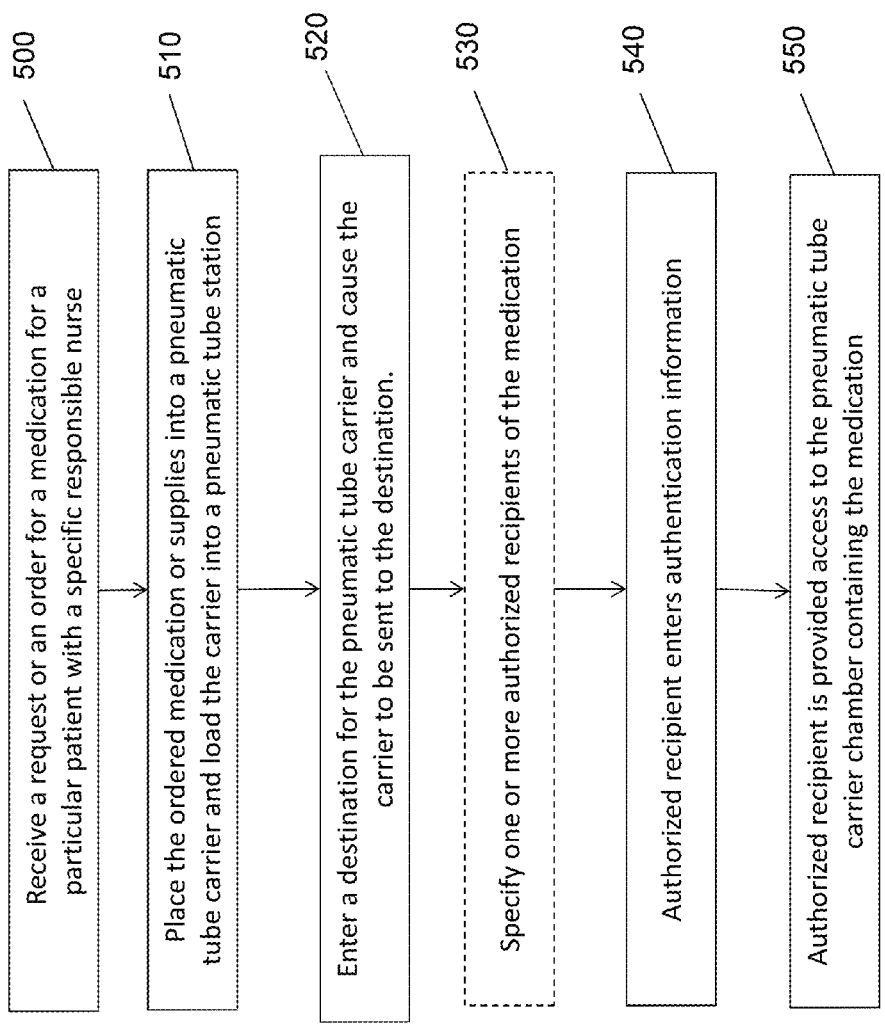
FIG. 6 illustrates a flowchart of an implementation of the pneumatic tube system of example embodiments of the present invention.

An example implementation of the present invention is herein described according to the flowchart of FIG. 6, describing a method and program product according to an example embodiment of the present invention. It will be understood that each block of the flowchart and combination of blocks in the flowchart may be implemented by various means, such as hardware, firmware, processor, circuitry, and/or other devices associated with execution of software including one or more computer program instructions. These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, the operations performed in accordance with a method according to one embodiment of the invention are described below in relation to the flowchart. As shown in FIG. 5, a central pharmacy of a healthcare facility may receive a request or an order for a medication for a patient on a ward of the healthcare facility with a specific nurse responsible for their care as shown at 500. A technician or pharmacist in the central pharmacy may fill the order or a portion thereof, and place the medication or supplies in a pneumatic tube carrier at 510 and load the pneumatic tube carrier into a pneumatic tube station. The technician or pharmacist may then enter the destination for the medication and related pneumatic tube carrier into a user interface 205 of a pneumatic tube system controller 200 and cause the carrier to be sent to the destination at 520. The destination may be in the form of a numerical address, or a location chosen from a menu, for example. Optionally, the technician or pharmacist may enter in one or more specific recipients that are authorized to access the medication as shown at 530. In such an embodiment, only the authorized recipients may be able to retrieve the carrier at the destination pneumatic tube station. At the destination pneumatic tube station, an authorized user may interface with the user interface 205 of a pneumatic tube system controller 200, such as interface 470 of FIG. 4, and provide authentication information in the form of a PIN, a biometric scan, an identification card scan, or the like at 540. Upon the destination pneumatic tube station receiving proper authentication information for the carrier, the authenticated user may be provided access to the carrier within the pneumatic tube carrier chamber at 550.

According to some example embodiments of the present invention, the pneumatic tube carriers may include identifying information, such as a unique barcode or a radio frequency identification (RFID) tag, for example. The barcode or RFID tag may encode a serial number for the carrier which may be associated with a medication order in the central pharmacy when the medication order is loaded into the carrier. This association may enable the pneumatic tube carrier and the medication order therein to be tracked throughout a healthcare facility. Readers (e.g. barcode readers or RFID tag readers) may be arranged within the pneumatic tube system and/or at the pneumatic tube stations. Upon receipt of a pneumatic tube carrier at a pneumatic tube carrier station the station may identify the carrier and thus recognize the medication order contained therein by referencing a database in which the medication order is associated with the pneumatic tube carrier identification. Thus, upon arrival at a pneumatic tube station, the pneumatic tube system controller may be able to associate a pneumatic tube carrier and medication order with a particular pneumatic tube carrier chamber, thereby recognizing the authenticated personnel that are able to access that particular chamber.

Figure 7:
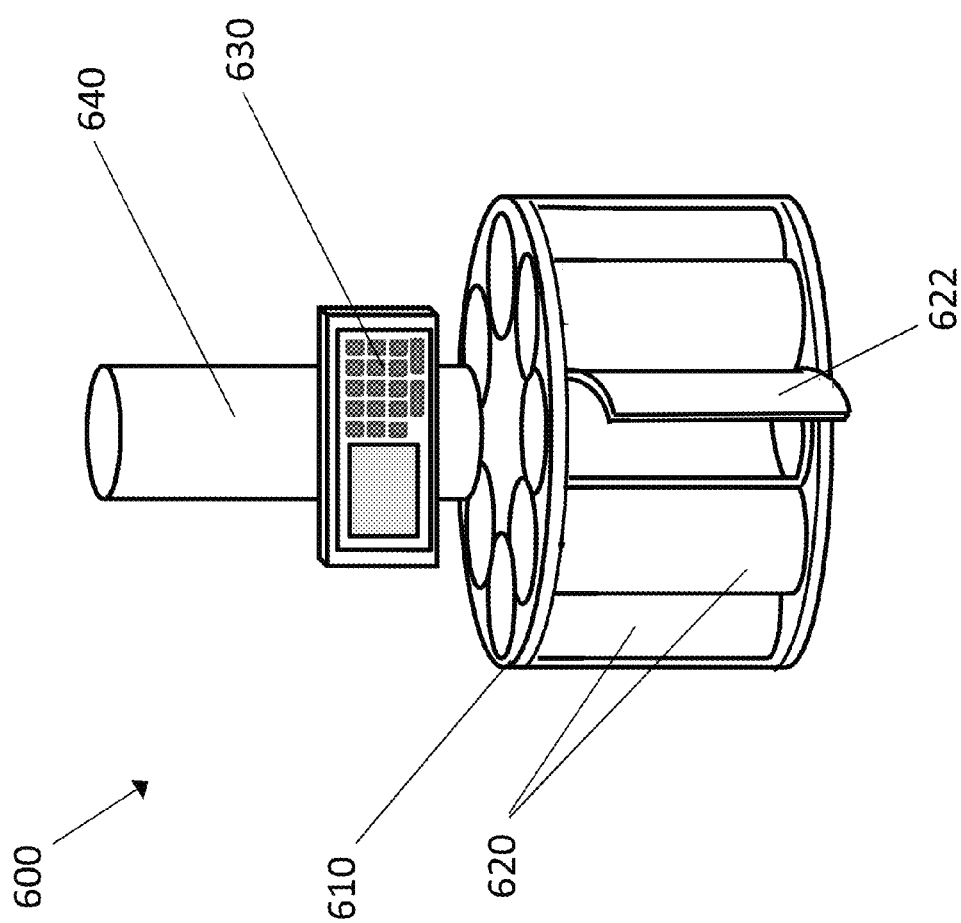
FIG. 7 illustrates a secure pneumatic tube station with a magazine of pneumatic tube carrier chambers according to another example embodiment of the present invention.

FIG. 7 illustrates another example embodiment of a pneumatic tube system 600 including a circular magazine 610 with a plurality of pneumatic tube carrier chambers 620 disposed about the circular magazine. The magazine may rotate relative to the pneumatic tube 640 to align pneumatic tube carrier chambers 620 in a send-and-receive position. As shown, the pneumatic tube carrier chamber 622 may be accessed in the same manner as described above with respect to FIG. 5. The embodiment of FIG. 7 further includes a pneumatic tube system controller 630 to provide authorized access to the pneumatic tube carrier chambers 620 among other functions. Further, while the illustrated embodiment depicts a magazine that rotates to position chambers 620 in the send-and-receive position relative to the pneumatic tube 640, embodiments may include a stationary magazine that has a pneumatic tube that moves between the various chambers 620.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:
1. A system comprising:
a magazine comprising a first carrier chamber and a second carrier chamber; and
a pneumatic tube operably coupled to the magazine, wherein the pneumatic tube is configured to be in fluid communication with one of the first carrier chamber or the second carrier chamber;
wherein the magazine is configured to be moved relative to the pneumatic tube between a first position in which the first carrier chamber is in fluid communication with the pneumatic tube and a second position in which the second carrier chamber is in fluid communication with the pneumatic tube, and
wherein the first carrier chamber and the second carrier chamber are each individually accessible to a user.

2. The system of claim 1, further comprising a controller configured to cause the magazine to be moved between the first position and the second position.

3. The system of claim 1, wherein the contents of the first carrier chamber and the second carrier chamber are visible to a user.

4. The system of claim 1, further comprising a receiver configured to carry the magazine, wherein the receiver aligns one of the first carrier chamber or the second carrier chamber with the pneumatic tube, and wherein the receiver comprises a release position, wherein the contents of the first carrier chamber and the second carrier chamber are accessible only when the respective carrier chamber is in the release position.

5. The system of claim 1, further comprising a controller configured to control access to the first carrier chamber and the second carrier chamber.

6. The system of claim 5, wherein the controller is configured to cause a carrier to be sent from one of the first carrier chamber or the second carrier chamber along the pneumatic tube.

7. The system of claim 5, wherein the controller is configured to allow access to the first carrier chamber or the second carrier chamber in response to receiving an authorized request.

8. The system of claim 7, wherein an authorized request comprises identification of a person requesting access to the first carrier chamber or the second carrier chamber.

9. A magazine for a pneumatic tube system comprising:
a first carrier chamber;
a second carrier chamber; and
a send-and-receive position, wherein the first carrier chamber and the second carrier chamber are configured to be moved between a first position in which the first carrier chamber is at the send-and-receive position, and a second position in which the second carrier chamber is at the send-and-receive position, wherein a chamber at the send-and-receive position is in fluid communication with a pneumatic tube of the pneumatic tube system, and
wherein the first carrier chamber and the second carrier chamber are each individually accessible.

10. The magazine of claim 9, further comprising an access position, wherein the contents of the first carrier chamber are accessible when the first carrier chamber is in the access position, and wherein the contents of the second carrier chamber are accessible when the second carrier chamber is in the access position.

11. The magazine of claim 9, wherein access to the first carrier chamber and the second carrier chamber is controlled by a controller.

12. A system comprising:
a magazine comprising a first carrier chamber and a second carrier chamber;
a receiver configured to receive the magazine therein, wherein the receiver comprises a send-and-receive position in which a carrier chamber at the send-and-receive position is in fluid communication with a pneumatic tube system; and
a controller configured to provide access to the first carrier chamber and the second carrier chamber,
wherein the receiver further comprises an access position in which contents of a carrier chamber at the access position are configured to be accessible to a user.

13. The system of claim 12, wherein the controller is configured to cause the magazine to be advanced to align the first carrier chamber or the second carrier chamber with the send-and-receive position or the access position.

14. The system of claim 12, wherein the contents of the first carrier chamber or the second carrier chamber are provided for display by the controller.

15. The system of claim 12, wherein the controller is configured to read an identification of a carrier received into one of the first carrier chamber or the second carrier chamber.

16. The system of claim 12, wherein access to the first carrier chamber or the second carrier chamber is provided in response to the controller receiving an authorized request.

17. The system of claim 16, wherein an authorized request comprises identification of a person requesting access to the first carrier chamber or the second carrier chamber.

* * * * *